United States Patent [19]

Bory

[11] Patent Number: 5,556,243

[45] Date of Patent: Sep. 17, 1996

[54] NECK DOWN CUTTER

[75] Inventor: William H. Bory, Baltimore, Md.

[73] Assignee: Chesapeake Corporation, Baltimore, Md.

[21] Appl. No.: 310,981

[22] Filed: Sep. 23, 1994

[51] Int. Cl.$^6$ .............................. B23D 7/08; B23D 1/00; B27G 5/00

[52] U.S. Cl. .............................. 409/226; 83/109; 83/437; 83/452; 409/159; 409/229; 144/371; 144/2.1; 144/135.2; 144/286.5; 269/287; 269/21

[58] Field of Search .......................... 83/36, 109, 435.1, 83/437, 452; 409/159, 163, 226, 228, 229; 144/2 R, 82, 84, 134 R, 134 A, 136 R, 242 R, 286 R, 286 A, 329, 371, 363; 269/21, 47, 291, 295, 287

[56] References Cited

U.S. PATENT DOCUMENTS

| | | | |
|---|---|---|---|
| 2,659,278 | 11/1953 | Schultz | 409/226 |
| 2,776,682 | 1/1957 | Mullen | 144/134 A |
| 3,606,916 | 9/1971 | Day | 144/134 A |

*Primary Examiner*—W. Donald Bray
*Attorney, Agent, or Firm*—Lowe, Price, LeBlanc & Becker

[57] ABSTRACT

A neck down cutter for notching parallel sides in a rectangular sample of corrugated material to be subjected to edge crush testing is disclosed. The cutter comprises a suction box formed with a recessed surface in the top thereof through which a motor driven cylindrical cutting element projects for rotary movement about a vertical axis. The recessed surface defines a slide path for a sample holder formed with a recessed positioning slot which receives the side edges of the sample material being cut. The sample holder is movable between a non-working position (out of cutting contact) into a working or cutting position with the cutting element. A supporting notch in the sample holder is itself initially formed via contact with the cutting element to accurately register and support the notch formed in the specimen during subsequent cutting. A method of cutting notches in rectangular corrugated test specimens is also disclosed.

21 Claims, 3 Drawing Sheets

NECK DOWN CUTTER

TECHNICAL FIELD

The present invention relates generally to the fabrication of samples of corrugated material for use in edge crush testing (ECT), and, more particularly, to the cutting of notches in parallel side edges of such corrugated samples to form a weakened center section to facilitate edge crush testing.

BACKGROUND ART

Corrugated cardboard is commonly used in the manufacture of shipping cartons having a wide variety of uses. The manufacturing of corrugated cardboard and the manufacturing of the cartons themselves are both well known and form no part of the present invention. However, in the manufacture of corrugated cartons, it is customary to determine the compression strength of the corrugated carton by edge crush testing of precision cut samples that are typically of square or rectangular dimensions. Heretofore, such samples were cut by hand, such as with a razor, knife or saw, or formed with a die. However, precision cutting machines are now available to form precision cut samples of corrugated cardboard. An example of one such machine is disclosed in U.S. patent application Ser. No. 08/127,542, filed Sep. 28, 1993, now U.S. Pat. No. 5,423,238 entitled "Method and Apparatus For Precision Cutting of Corrugated Cardboard and Reference Rod Assembly Therefor," assigned to the assignee of the present invention.

Once the corrugated rectangular samples have been precision cut, it is then necessary to form cutouts or notches in parallel side edges thereof to define a center section of predetermined cross-section to establish a known failure or weak point where the sample will fail when subjected to a predetermined crush load during testing. In the industry, a pair of arcuate, semi-circular, or V-shaped notches are formed in the parallel side edges so that the resulting center portion has an hourglass-like configuration and a precise dimension of 1" in the center portion as measured between the two notches as in the case of a 2"×2" sample. An example of a sample ready for edge crush testing is depicted in FIG. 2 of this application.

There are known cutting machines in the industry that are used to form cut-outs of arcuate or V-shape and one such machine generally utilizes a pair of razor blade type assemblies to cut the notches. Often, however, the sample is destroyed since the blades are incapable of cutting completely through the edge of the material. As the blades start to engage the respective edges, the second blade does not always reliably engage the second edge which simply causes the sample to be crushed, particularly in corrugated materials of lesser thickness.

Another known method for preparing rectangular samples for edge crush testing involves dipping in hot wax. The wax has to be a certain temperature and the corrugated material has to be partially immersed in the wax for a certain period of time. Deviations in either time or temperature result in uncontrolled migration within the sample. Furthermore, considerable time is necessary to enable the wax within the sample to dry and cure.

It is accordingly one object of the present invention to cut notches, with precision, in corrugated samples in an easy and reliable manner.

Another object is to cut notches within corrugated samples in a manner which result in sharp, not fuzzy, cut edges.

Still a further object is to notch corrugated samples in a reliable manner, irrespective of whether the sample is of one, two or three or more wall thicknesses.

SUMMARY OF THE INVENTION

A neck down cutter for cutting one or more notches in one or more side edges of a rectangular sample of corrugated material to enable edge crush testing thereof, in accordance with the invention, comprises a plate including a support surface having a cutting element operatively positioned therein. A sample holder is mounted to the plate and is adapted to receive the sample. Relative movement between the sample holder and cutting element between a non-working position and a working position wherein the sample is in cutting contact with the cutting element enables the notch to be cut in the side edge, one edge at a time.

The cutter preferably includes means for slidably supporting the sample holder on the plate. To that end, the support surface is disposed within a rectangular upward facing recess in the plate and the sample holder is slidably disposed in the recess. The slidable support means, while permitting the aforesaid sliding movement to occur, preferably prevents movement of the sample holder in a direction perpendicular to the slide path, either laterally or vertically.

The cutting element preferably projects upward through a cut-out in the support surface as well as a mating cut-out in the sample holder in the working position. The sample holder cut-out assists in supporting the sample to obtain clear, sharp and square cuts without fuzzy edges.

In accordance with a unique feature of this invention, the cut-out in the sample holder is preferably and initially formed by the cutting element when the sample holder is first used and initially relatively advanced into cutting contact with the cutting element. Forming the sample holder cut-out in this manner advantageously assures that the sample holder cut-out and the cut formed in the specimen side edge are in perfect registry with each other in the working position so that squareness in cut can be assured.

In the preferred embodiment, the sample holder is formed with an upward facing recess having side walls adapted to receive corresponding side walls of the sample to align same with the cutting element. The sample holder cut-out is formed in the recess and that side edge of the holder containing the cut-out further includes a lip adapted to engage an edge of the sample being notched to ensure positive retention of the sample in the recess during movement to the non-working position.

In accordance with a further feature of this invention, suction is applied through the sample holder during cutting to both positively seat the sample against the holder while removing cuttings from the sample generated by the cutting element.

The cutting element is preferably driven by a router motor mounted within the cutter. Preferably, the motor housing to which the router motor is attached is adjustable in height to correspondingly adjust the height of the cutter element relative to the sample holder. This allows fresh portions of the cutting element to be exposed for prolonged use of the cutting element with infrequent replacement.

A cover is preferably positioned above the cutting element to minimize leakage of suction through the sample holder.

Both the cutting element motor as well as the vacuum supply source are electrically connected to a switch which is positioned to be actuated by the sample holder during the aforesaid relative movement between the non-working and working positions. Preferably, the switch is a limit switch adapted to engage, and be depressed by, a slot formed in a lower surface of the sample holder as the aforesaid relative movement occurs. This type of switch actuation ensures that both the cutter and vacuum are operated only when the sample holder relatively moves to the working position, with automatic shut-off occurring as the sample holder relatively moves out of the working position toward the non-working position.

After a notch is cut in one of the sample edges, and the sample holder is relatively moved to the non-working position, an actuator is manually engaged to eject the sample from the holder without destructive manual engagement of the side edges by the operator. The operator can then easily turn the sample through 180° to expose the opposite parallel edge and place same in the sample holder for cutting.

A method of notching parallel side edges in a rectangular specimen of corrugated material, in accordance with a further feature of this invention, comprises placing the specimen in a sample holder and then relatively moving the sample holder and the cutting element together to form a first notch in one of the side edges of the sample. The cutting element and sample holder are then relatively moved away from each other. The specimen is removed from the holder and re-positioned to expose the other parallel edge to be cut.

In accordance with a further feature of the above method, the holder is first initially advanced into cutting engagement with the cutting element to cut a notch in the holder prior to use with a sample. In this manner, the notch in the holder will advantageously be in perfect registration with the notch subsequently cut in the specimen to ensure squareness of cut without fuzzy edges.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIGS. 1 and 1(a) are an exploded perspective view of a neck down cutter in accordance with a preferred embodiment of the present invention;

BEST MODE FOR CARRYING OUT THE INVENTION

Figure 1:
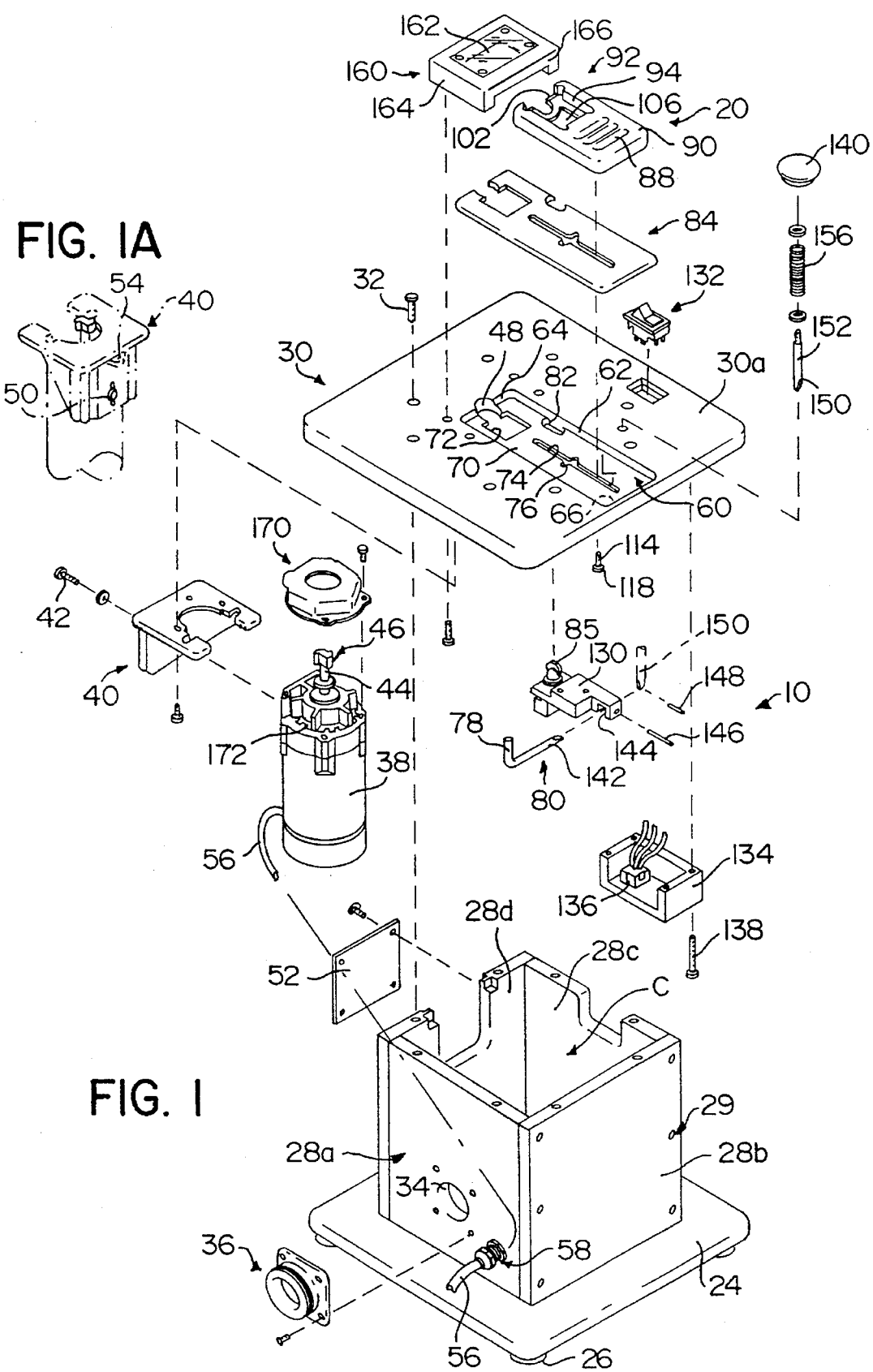
Figure 2:
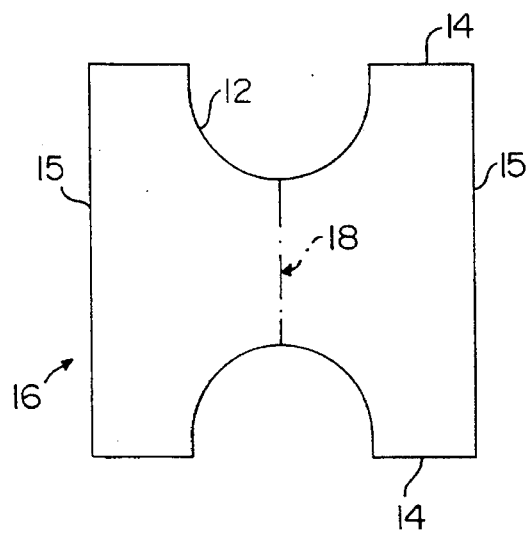
FIG. 2 is a top plan view of a rectangular sample of corrugated cardboard with two semi-circular notches cut therein with the cutter of FIG. 1.

FIG. 1 is an exploded perspective view of a neck down cutter, generally designated with reference numeral 10 which operates in a unique and precise manner to rapidly and easily form a preferably semi-circular notch 12 in each of two parallel sides 14 of a square sample of corrugated material 16 (see FIG. 2) which is to be subjected to edge crush testing (ECT). Applicable industry standards in connection with the manufacture and testing of corrugated cardboard boxes and materials require that a standard 2"×2" sample 16 (which is formed from corrugated cardboard with any one of numerous sample cutters on the market) be formed with a 1" center section 18 which will define the weakest portion of the sample that will fail when subjected to a crushing load in a testing machine. Neck down cutter 10 is thus used to form center section 18 by sequentially cutting the pair of cut-outs 12 from square sample 16 initially received in a sample holder 20 discussed below, in a manner that will result in a clean and square cut through the entire thickness of the corrugated material.

Sample cutter 10 is comprised of a rectangular base 24 supported by feet 26 on a preferably horizontal support surface (not shown in detail). Four rectangular vertical side plates 28a, 28b, 28c and 28d project upward from the base 24 to define sides of a box and are bolted together with screws 29 to form an interior compartment C having an open top adapted to be covered by a top plate 30 attached to upper edges of the sides with screws 32. One of the vertical sides 28a is formed with a circular opening 34 adapted to receive a vacuum hose adapter 36 to which a vacuum hose (not shown in detail) is attached to supply vacuum to the interior compartment C for purposes discussed more fully below. The front side 28d of the box supports a motor 38 which is secured to the inner vertical surface thereof by means of a motor mounting bracket 40 and screws generally designated with reference numeral 42. The vertical motor shaft 44 projects upward from the motor 38 to support a cutting element 46 which is thereby disposed in a fixed horizontal plane during cutting in elevational alignment with a circular recess 48 formed in the top plate 30 as described more fully below.

The motor support bracket 40 is formed with an adjustment rod and knob, generally identified by reference numeral 50, which may be manually accessed by removal of a cover plate 52 from the front side 28d to adjust the elevation of the cutting element 46 by raising and lowering the motor housing 38 between cuttings through rotation of adjustment knob 54. Further details and description of the motor mounting bracket 40 and knob 54 will be omitted here for simplicity of description, however, the detailed construction and operation thereof will be readily known to one of ordinary skill in the art.

An electric cord 56 attached to the motor 38 extends through a strain relief connector 58 in the left side 28a of the box for connection to an electrical supply (not shown) in a known manner.

The top plate 30 is formed with an upwardly facing rectangular recess 60 in an upper surface 30a thereof having a pair of long, vertical parallel sides 62 and a pair of shorter, vertical parallel sides 64 and 66 respectively formed at opposite ends thereof. The circular opening 48 formed in the top plate 30 through which the cutting element 46 extends intersects one of the short vertical sides 68 of the rectangular recess 60 to form a half-moon shaped opening therein with the other half-moon being formed in the recessed bottom wall 70 to complete the circular opening.

The upward facing surface of the rectangular recess bottom wall 70 further includes a substantially square cut-out 72 having one side in open communication with the circular cut-out opening 48. The purpose of this rectangular cut-out 72 is to transmit vacuum supplied to the vacuum box interior C through the vacuum hose for a variety of purposes described below.

The rectangular recess bottom wall 70 is also formed with an elongate through slot 74 extending along a central longitudinal axis L of the recess 60 from the short side 66 (opposing the circular cut-out 48) towards the square cut-out 72 without intersecting the latter. This elongate slot 74 defines a guide path permitting movement of sample holder 20 along the longitudinal axis L from a non-working position (adjacent side 66) towards a working position in alignment with the cutting element 46 as described more fully below.

A short transverse through slot 76 is also formed in the upward facing surface of the recess bottom wall along an intermediate portion thereof. The purpose of this transversely extending slot 76 is to receive the upwardly projecting end 78 of an ejector rod assembly 80 which is used to remove the sample 16 (by contacting the underside thereof) from holder 20 as described more fully below.

The rectangular recess 60 is also formed with a short longitudinally extending slot 82 in a position closely adjacent one of the long recess side walls 62 and laterally spaced from the end of the longitudinal guide slot 74 closest to the square vacuum supply cut-out 72. The purpose of this short longitudinal slot 82 is to receive a limit switch 85 projecting upwardly therethrough for depressible contact with the sample holder 20 to actuate both the vacuum system and the cutting element 46 as described below.

Both the sample holder 20 and top plate 30, as well as base 24 and sides 28a–28d are preferably made of aluminum. To prevent undesirable wearing contact between the sample holder 20 with the upward facing surface of the recess 60, an anvil slide plate 84 (e.g., of hardened tool steel) preferably covers the entire recessed surface 70. Therefore, the stationary anvil slide plate 84 is formed with the longitudinal guide slot, transverse ejector slot, longitudinal limit switch slot, square vacuum cut-out and half-moon cutting element cut-out in respective perfect registration with the underlying slots and cut-outs 72, 74, 76 and 82 in recess bottom 70 discussed above.

Figure 3:
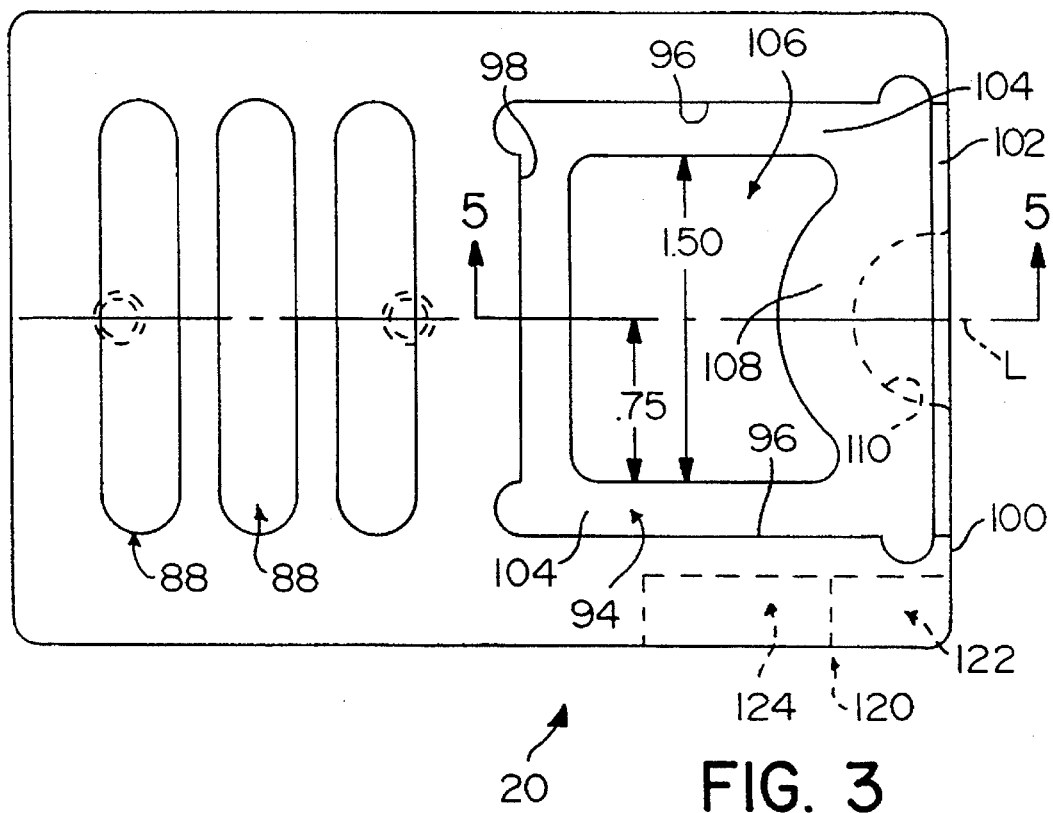
FIG. 3 is a top plan view of a sample holder as used in the cutter of FIG. 1.

Sample holder 20 is preferably machined from rectangular aluminum stock formed with transverse fingergripping indentations 88 in the non-working end 90 of an upper surface thereof which permits the sample holder to be manually slid along the smooth slide surface of the anvil slide 84 between non-working and working positions described in more detail below. The working end 92 of the sample holder 20 is formed with a generally square recess 94 having parallel longitudinally extending recess side walls 96 (FIG. 3) which are spaced to snugly contact and center the parallel sides 15 (FIG. 2) of the sample material 16 located perpendicular to the sides 14 which will be cut. The square recess 94 includes a third side wall 98 formed to engage and position one of sample sides 14 when it is not being cut so that the opposite side 14 to be cut is in proper registration with the cutting element 46 when the sample is slid into the working position.

Figure 5:
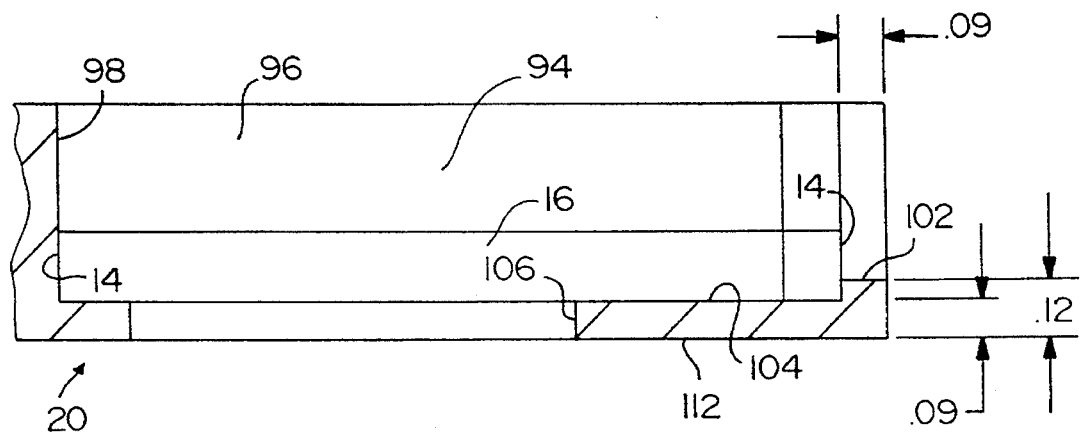
FIG. 5 is a sectional view taken along the line 5—5 of FIG. 1 to further depict details of the sample holder recess.

The sample holder recess 94 is open at the working end of the sample holder 20 and the vertical side wall 100 formed at this working end is adapted to contact the corresponding side wall 64 in the rectangular recess 60 of the top plate 30 to enable precise positioning of the sample holder at the working end. Although the square sample holder recess 94 is open along the working end, the fourth side of the recess is nonetheless defined by a short lip 102 projecting upwardly from the recess bottom wall to capture a corresponding lower edge of the sample side wall 14 being cut as best depicted in FIG. 5. The purpose of this lip 102 is to ensure that the sample 16 remains within the sample holder recess 94 as the sample holder 20 is manually slid towards its non-working position.

The bottom wall 104 of the sample holder recess 94 is also formed with a substantially square vacuum supply cut-out 106 which is in juxtaposed alignment with the corresponding cut-out 72 in the anvil slide 84 when the sample holder 20 is in the working position. This ensures that vacuum within the box is exerted on the sample underside so that the sample remains positively seated within the sample holder recess 94 during cutting. One side of this vacuum supply cut-out 106, in plan view, is formed as a curved member 108 which is defined by the half-moon cut-out 110 and the sample support lip 102 (on opposite sides of the cut-out) along a portion facing towards the working end of the sample holder. This half-moon cut-out 110 (forming part of opening 48) in the sample holder recess bottom wall 104 underlies the sample material 16 prior to cutting and, in the working position, is adapted to be in perfect registration with the cutting element 46 to ensure a sharp cut without a fuzzy edge.

In accordance with a highly preferred feature of the present invention, the half-moon cut-out 110 in the sample holder 20 is actually formed by the cutting element 46 upon initial sliding advancement of the sample holder 20 for the first time into its working position. In other words, the sample holder 20 is initially formed without the half-moon cut-out 110 which is actually then formed by the cutting element during initial advancement as mentioned above. This ensures perfect alignment between the cutting element 46 within a particular neck down cutter 10 with the sample holder 20 (now dedicated for use with that cutter). For that reason, it is a preferred feature to ensure that holder 20 is made of a material that can be cut with element 46.

The lower surface 112 (FIG. 4) of the sample holder 20 is predominantly flat to ensure smooth sliding contact with the upper surface of the anvil slide 84. A screw 114 extending through the juxtaposed guide slots 74 in both the top plate 30 and anvil slide 84 has an upper end threadedly secured to the sample holder underside, at 116, and a lower end defined by a screw head 118 captivated against the bottom surface of the top plate in sliding contact therewith. This arrangement ensures that the sample holder recess 94 and bottom wall 104 thereof is positively maintained in a constant plane as the sample 16 seated therein is slidingly advanced into cutting engagement with the cutting element 46.

Figure 4:
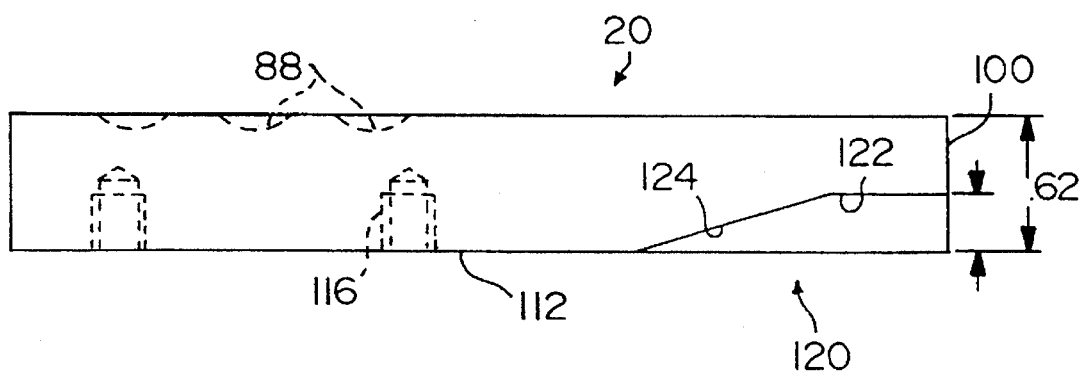
FIG. 4 is a side view of the sample holder of FIG. 3.

The bottom surface 112 of the sample holder 20 is also preferably formed with a limit switch actuating slot 120 adapted to depressingly engage the limit switch 85 projecting upward from the upper surface of the anvil slide 84 through the limit switch slot 82 as the sample holder is slid towards the working position. As best depicted in FIG. 4, the limit switch actuating slot 120 includes an entrance end 122 of constant height opening in the working end side 100 of the sample holder 20. This entrance end 122 of the slot terminates in a rearwardly and downwardly inclined slotted portion 124 which terminates at its rearwardmost end in the sample holder bottom surface 112. In this manner, the limit switch 85 is gradually depressed by the actuating slot 120 and is retained in its depressed or "ON" position as long as the sample holder 20 is in its working position. As the sample holder 20 is manually slid rearwardly (i.e., towards side 66 of recess 60) from the working to non-working position, the inclined slot 124 permits the limit switch 85 to be gradually raised to its "OFF" position.

With reference to FIG. 1, the limit switch 85 extends upward from an ejector bracket 130 which is secured to the bottom surface of the top plate 30 with screws. Although not shown in detail, the limit switch assembly attached to the bracket 130 is wired to a switch 132 which, in the "ON" position, supplies electrical power to both the cutting element motor 38 as well as the vacuum supply system. This power switch 132 is wired to the motor 38, vacuum supply system, and limit switch assembly through a receptacle box 134 and receptacle 136 which are secured to the underside of the top plate 30 with screws 138. However, the cutting element motor 38 as well as the vacuum supply are not actuated until the limit switch 85 is depressed into the "ON" position by the sample holder 20 advancing towards its working position as discussed fully above.

After one of the sample sides 14 is formed with a cut-out 12 in the manner describe above, the sample holder 20 is manually slid back towards its non-working position at the end of the rectangular recess 60 located remote from the cutting element 46. In this position, the sample ejector/ vacuum supply cut-out 106 formed in the sample holder recess 94 overlies the juxtaposed ejector slots 76 formed in the anvil slide 84 and rectangular recess 60, respectively. At this point, ejector rod 78 is raised by manually depressing a sample ejector knob 140 mounted to the top plate 30 so that the ejector rod travels upward through the ejector slots 76 to contact the sample underside and lift it out of the recess 94. Since the sample 16 is normally retained within the recess 94 in snug fitting and positive contact with the recess side walls 96, 98 and 102, the feature of ejecting it via gentle but firm lifting pressure exerted on the sample underside in the manner described above ensures that the operator's fingers will not destructively engage the sample sides in potentially destructive forcible removal.

The ejector rod 80 includes vertically extending ejector rod portion 78 having a preferably smooth rounded upper end adapted to extend through the ejection slots 76 into contact with the sample underside. A horizontally extending portion 142 of the ejector rod 80 is pinned within a downward facing ejector rod retaining slot 144 in the ejector bracket 130. This pin 146 defines a horizontal pivot axis or fulcrum for the ejector rod 80. The distal end of the horizontal portion 142 formed on the opposite side of the fulcrum 146 is pinned at 148 to the lower end 150 of a vertically extending actuating rod 152 projecting through the top plate 30 and from the upper surface thereof to receive the ejector knob 140. A spring 156 mounted on the rod 152 between the upper surface of the top plate 30 and the knob 140 ensures that the rod is normally in an upper biased position which causes the ejector rod 78 to assume a normal lower position. Depressing of the knob 140 against spring bias causes the rod 152 to lower and the ejector rod 78 to raise about the fulcrum 146.

The rectangular recess 94, containing the cutter element 46 in the working position, is preferably covered with a rectangular cover 160 bolted to the upper surface of the top plate 30. In the preferred embodiment, a plastic or other type of transparent shield 162 is disposed in the top surface of the cover 160 to permit viewing of the cutting action. The cover 160 is essentially closed along three vertical sides 164 thereof and is open along a fourth side 166 facing the sample holder 20 to permit the holder to travel through the opening into its working position beneath the cover. In this working position, the upper surface of opening 166 formed in the cover 160 is adapted to preferably, but not necessarily, lightly contact the top surfaces of the sample holder 20 located adjacent the sample holder recess 94. This effectively seals the working end of the sample holder 20 when it is in working position beneath the cover 160 so that vacuum is applied, with minimal escapage, only to the sample underside to ensure vacuum seating contact as aforesaid.

An additional function of the vacuum system is to remove particles and cuttings which are generated during operation. These cuttings and particles are sucked down into box interior C and removed through the vacuum hose attached to fitting 36. Since the motor 38 is preferably provided with a cooling fan, as is conventional, the invention further features a dust cover 170 which is secured to the motor housing to cover the fan openings 172 and thereby prevent the cuttings and particles from clogging the fan motor.

It will also be appreciated that the cover 160 protectively isolates the cutting element 46 from inadvertent contact with the cutter operator for improved safety.

The cutting element 46 is, in the preferred embodiment, preferably a router blade in the form of a full carbide blade having a height preferably at least equal to corrugated material of up to triple wall thickness (i.e., approximately 1" in height). This enables the neck down cutter 10 of the invention to effectively cut notches 12 within corrugated material 16 of up to triple wall thickness in the same cut.

During prolonged operation, the aforementioned cutting element 46 becomes smaller in diameter as a result of wear. The feature of vertically adjusting the position of the motor 38 in the manner described above advantageously allows the operator to vertically or elevationally advance a fresh portion of the cutting element 46 into elevational cutting position.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A neck down cutter for cutting one or more notches in one or more side edges of a rectangular sample of corrugated material, comprising:

(a) a plate including a support surface having a cutting element operatively positioned therein; and (b) a sample holder mounted to the plate, and being adapted to receive the sample, for relative movement between a non-working position and a working position wherein the sample is in cutting contact with the cutting element.

2. The cutter of claim 1, further comprising means for slidably supporting the sample holder on the plate.

3. The cutter of claim 1, wherein said support surface is disposed within a rectangular upward facing recess in the plate and said sample holder is slidably disposed with said means in said recess.

4. The cutter of claim 3, wherein said cutting element projects upward through a cut-out in the support surface and said sample holder includes a cut-out, adapted to be covered by the sample when operatively positioned on the holder, into which the cutting element progressively extends as both the sample and sample holder, in relation to the cutting element, relatively advance toward said element.

5. The cutter of claim 4, wherein said sample holder is manufactured without said cut-out, and said cut-out in said sample holder is initially formed by the cutting element when the sample holder is initially relatively advanced into cutting contact with the element.

6. The cutter of claim 4, wherein said sample holder is formed with an upward facing recess having side walls adapted to receive corresponding side walls of the sample to align same with the cutting element.

7. The cutter of claim 1, wherein said sample holder is formed with an upward facing recess having side walls adapted to receive corresponding side walls of the sample to align same with the cutting element.

8. The cutter of claim 7, wherein said sample holder cut-out is formed in the recess and said recess further comprises a lip adapted to engage an edge of said sample being notched to ensure positive retention of the sample in the recess during movement to the non-working position.

9. The cutter of claim 8, further comprising vacuum supply means for applying suction through the sample holder to positively seat the sample therein and remove cuttings from the sample generated by the cutting element.

10. The cutter of claim 1, further comprising vacuum supply means for applying suction through the sample holder to positively seat the sample therein and remove cuttings from the sample generated by the cutting element.

11. The cutter of claim 10, further comprising a cover positioned above the cutting element to minimize leakage of suction.

12. The cutter of claim 9, further comprising electrical switch means for actuating said cutting element and said vacuum supply means.

13. The cutter of claim 12, wherein said electrical switch means is positioned to be actuated by the sample holder during the aforesaid relative movement of the sample holder and cutting element between the said non-working and working positions.

14. The cutter of claim 1, further comprising an electrical switch operatively electrically connected to the cutting element, and being positioned in the relative path of movement between the sample holder and cutting element so that the switch is contacted and thereby actuated by the sample holder during the aforesaid relative movement between the working and non-working positions.

15. The cutter of claim 1, further comprising an ejector mechanism positioned for contacting an underside of said sample through the support surface to eject the sample from the holder without destructive engagement of the side edges.

16. The cutter of claim 15, wherein said ejector mechanism is a lifting rod pivotally connected to an ejection bracket along a pivot axis, and an actuating pin, connected to a part of the lifting rod located on an opposite side of the pivot axis, whereby movement of the actuating pin is operable to raise the lifting rod about the pivot axis.

17. The cutter of claim 1, wherein said cutting element is a cylindrical router bit.

18. The cutter of claim 17, wherein the height of said router bit is at least equal to a corrugated material of triple wall thickness.

19. The cutter of claim 17, further comprising means for adjusting the height of the cutting element relative to the sample holder.

20. A method of notching parallel sides in a rectangular specimen of corrugated material, comprising the steps of:

(a) placing the specimen in a sample holder;

(b) relatively moving the sample holder, with specimen thereon, and a cutting element together to form a first notch in one of the said sides;

(c) relatively moving the sample holder, with specimen thereon, and the cutting element away from each other;

(d) removing the specimen from the holder and repositioning it to expose the other of said parallel edges yet to be cut; and (e) repeating steps (b) and (c).

21. The method of claim 20, wherein said sample holder is manufactured without a said first notch, and comprising the step of initially cutting said first notch in the holder with said cutting element by relatively moving the holder element into cutting contact with said element along the said path defined in step (b).

* * * * *